March 29, 1955 E. O. LAWRENCE ET AL 2,705,257

COLOR TELEVISION SYSTEM

Filed March 20, 1950 3 Sheets-Sheet 1

INVENTORS.
ERNEST O. LAWRENCE
WILLIAM ROSS AIKEN
DICK A. MACK

BY Lippincott & Smith

ATTORNEYS

COLOR TELEVISION SYSTEM

Filed March 20, 1950 3 Sheets-Sheet 2

INVENTORS.
ERNEST O. LAWRENCE
WILLIAM ROSS AIKEN
DICK A. MACK
BY Lippincott & Smith
ATTORNEYS March 29, 1955 E. O. LAWRENCE ET AL 2,705,257

COLOR TELEVISION SYSTEM

Filed March 20, 1950 3 Sheets-Sheet 3

INVENTORS.
ERNEST O. LAWRENCE
WILLIAM ROSS AIKEN
DICK A. MACK
BY Lippincott & Smith
ATTORNEYS United States Patent Office 2,705,257

Patented Mar. 29, 1955

2,705,257

COLOR TELEVISION SYSTEM

Ernest O. Lawrence, William Ross Aiken, and Dick A. Mack, Berkeley, Calif., assignors, by mesne assignments, to Chromatic Television Laboratories, Inc., a corporation of California Application March 20, 1950, Serial No. 150,731

21 Claims. (Cl. 178—5.2)

This invention relates to systems and apparatus for transmitting television images in color. Particularly it relates to the display of tricolor television images transmitted either by the so-called "simultaneous" system of transmission or by the "dot-sequential" system upon the display surface of a single direct-view color cathode ray tube wherein the color of any individual picture element is determined by a control potential or potentials applied to the tube. Such a tube is that described in the copending application of Ernest O. Lawrence, Serial No. 150,732, filed concurrently with this application.

Various types of color television transmission systems have been proposed in the past. Among the systems are the simultaneous system, wherein three complete video signals are transmitted, usually each modulated upon a sub-carrier which is in turn modulated upon a primary carrier. In such simultaneous systems it has generally been the practice to pick up each of the three signals, representative respectively of the red, green, and blue primary components of the image to be transmitted, upon three separate camera tubes. The signals thus picked up are modulated upon the sub-carriers as already mentioned, remodulated upon the primary carrier, and radiated, together with the usual synchronizing signals, as a single composite signal. At the receiver first the sub-carriers and then the separate video signals carried thereby are separately detected, each of the video signals is applied to modulate the beam of a separate electron gun, the beams from these three guns are swept over an appropriate display surface or surfaces and the images produced upon these surfaces in the three primaries employed by the system are combined to form the final polychrome image. The three electron guns have, in general, been disposed in three separate cathode ray tubes, but polychrome tubes have been proposed in which the three guns are included in a single envelope and are directed to the same target area, the color produced by the streams from each gun being determined either by the angle from which the electron streams impinge upon the target area or by some other appropriate means.

Whether separate tubes or a single three gun tube are employed the arrangements mentioned involve registration problems, both optical and electrical. Such problems are entirely avoided by tubes of the class described in the copending application already mentioned, but since this tube employs but a single cathode ray gun and modulating grid it is not apparent that it would be applicable to receive transmissions of the simultaneous type. One of the objects of this invention is to provide a means for receiving simultaneous color television transmissions upon the type of tube mentioned and upon others of the same general class.

In sequential systems images of the primary colors employed are "sampled," the sampling occurring over longer or shorter periods, and signals representative of the samples are transmitted successively. Another object of this invention is to provide a sampling system of the so-called "dot-sequential" type, wherein the samples are of the general order of magnitude of a picture element, such sampling occurring in a manner to produce the maximum resolution of detail. Still a further object of the invention is to provide a means and method of synchronizing the switching devices with which the sampling is accomplished at both transmitter and receiver, and this without the transmission of any signals other than those normally employed to transmit black and white pictures with their accompanying sound.

Our invention has other objects and advantages which will be referred to or will become apparent in the description of the invention which follows.

Standards for the transmission of monochrome television pictures and their accompanying sound which are presently current in the United States States provide for 525-line pictures transmitted at 30 frames per second with a 2:1 interlace. This implies that a vertical scanning rate of 60 cycles per second is used, with a horizontal scanning rate of 15,750 cycles per second. If the sawtooth waves of these two frequencies are accurately synchronized and applied to deflection circuits of a cathode ray tube the beam of the tube will trace upon the display surface two rasters of a nominal 262½ lines each, with the lines of the second raster intermediate those of the first. If the recovery or fly-back time of the sawtooth waves were zero this would result in pictures comprised of 525 lines per frame. Actually the fly-back time is finite and the cathode ray beam is blocked out during the fly-back periods. This results in a television image wherein approximately 480 lines are actually visible upon the display screen. In other countries other rates of scanning, both vertical and horizontal, have been adopted, and the present invention is applicable to any of these standards. References to pictures transmitted by the standards mentioned are therefore taken to be illustrative only, since only minor modifications are required to adapt the invention to any standard required.

Transmission standards also specify the manner of transmitting the accompanying sound. At present such sound is transmitted upon a separate carrier spaced approximately 4.5 megacycles from the video carrier. The picture signals are amplitude modulated upon the latter; audio signals are frequency modulated upon the audio carrier. These facts are germane to the instant invention and should be kept in mind.

It has already been mentioned that the tube described in the above identified copending application utilizes a single electron gun and that the color displayed by the tube when the cathode ray stream from the gun impinges upon the target area is determined by potentials applied to certain controls within the tube. This tube will be described in some detail hereinafter; for the present it suffices to state that phosphors emissive of three primary colors are deposited upon different areas within the tube, and that the relative potential of certain deflecting electrodes within the tube determines which of the three primary colors will be displayed. If these deflecting electrodes are of like potential one primary color will be produced by the undeflected cathode ray beam; a differential potential applied between the electrodes in one direction will cause the emission of light of another primary color while reversing a relative potential of these electrodes will cause the emission of the third primary. From a purely electrical point of view it makes no difference which primaries are produced by any of the three conditions mentioned; from the psychological point of view, however, since the normal eye is most sensitive to green, it is of advantage to have a geen phosphor so disposed as to emit when the deflecting electrodes are at the same relative potential, differential potentials between these electrodes producing red or green luminescense depending upon the direction of the potential applied.

Broadly considered in one aspect, the system of our invention involves a sampling process, but the sampling may occur either at the transmitter, producing a signal of the dot-sequential type, or signals of the simultaneous type may be transmitted and the sampling may be caused to occur at the receiver at as high a rate as may be desired. Considering first the invention as applied to receive signals of this latter character, an oscillator is provided at the receiver which operates at some relatively high frequency, preferably of the order of magnitude of that required to produce the smallest picture element contemplated by the system. The output of this oscillator may, if desired, be clipped to produce flat top waves, but this is a refinement. The potentials produced by this oscillator are applied in opposite phase to the deflecting electrodes of the tube which are determinative of the color produced thereby and are also applied to gating tubes to admit signals of the corresponding color to the electrode which controls the intensity of the cathode ray beam. A portion of the output of the oscillator is also applied to a harmonic amplifier which amplifies and selects double the frequency of the oscillator, i. e., its second harmonic. Phase rotating means is used so that the second harmonic is displaced in phase by 90 electrical degrees, to produce a peak of potential each time the fundamental frequency passes through zero. The output of this harmonic amplifier is applied to the gate which controls the signal to the main target, preferably the green signal.

In this form of the device the oscillator may be free running, and the sampling may take place as often as desired. Effectively the simultaneously transmitted signals are converted into dot-sequential signals, but the rate of sampling may be as high as desired without imposing any additional frequency requirements upon the communication channels. The effect of the method of sampling is to produce double the number of green dots in the polychrome image that are produced by either the red or the blue signals. Since the eye perceives detail most readily when depicted in green this results in increased apparent resolution in the television image, but since the green signals are only half of the length of those corresponding to red and blue there is no preponderance of green recognized by the eye and a true color balance can be maintained.

In another of its broad aspects the invention applies where the signals are transmitted by the dot-sequential system in the first instance the same general type of control is used, but it is applied both at transmitter and receiver. In this instance the frequency of the sampling oscillator is not a matter of free choice but it is taken as the beat frequency between the video and sound carriers. At the transmitter the two carrier frequencies are intermodulated and the difference frequency is selected from modulation products and used to gate the channels carrying signals representative of the three primary color images in precisely the manner already described. At the receiver the same process is repeated as regards the intermodulation to develop the beat frequency signal, which applied to the deflecting electrodes of the color tube to select the color displayed thereby. A complete and continuously acting interlock between the gates and the color control is thereby obtained without a transmission of any signals other than are required for the complete representation of a black-and-white picture with sound. The fact that the sound carrier is frequency modulated does not affect the final result, since the frequency swings of the modulated signal are small in comparison with the separation of the two carriers and such change as this does produce in the size of the dot samples are unimportant as regards the overall result. The dot pattern produced at the receiver is precisely the same as that already described in connection with its use in transmission to the simultaneous type.

The invention will be more clearly understood by reference to the following more detailed description by reference to the accompanying drawings wherein.

Figure 1:
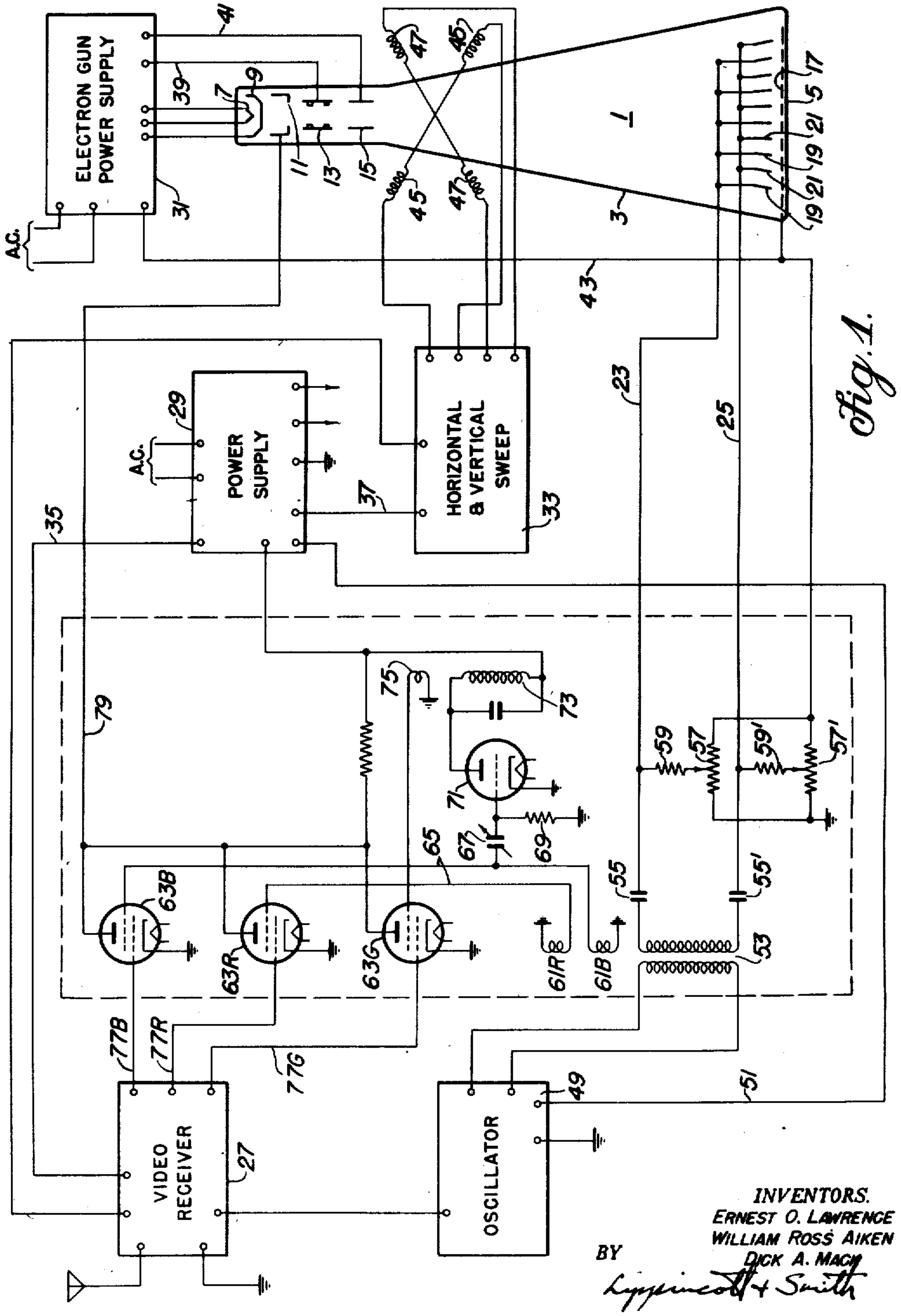
Fig. 1 is a schematic diagram, largely in block form, of the invention as used in connection with polychrome television transmissions of the simultaneous type.

Considering first the application of the invention illustrated in Fig. 1 the color cathode ray tube used and generally indicated by the reference character 1 is that disclosed in the copending application identified above. This tube comprises the usual evacuated envelope 3, provided with a display window 5 on one end, and, at its other end, the cathode ray gun comprising a heater 7, thermo-emissive cathode 9, control electrode or grid 11, and first and second anodes 13 and 15. Other conventional types of electron gun can, of course, be used, and focusing of the beam can be accomplished either by electron lenses established between the first and second anodes or by an external magnetic focusing coil (not shown).

A translucent luminescent screen 17 is deposited directly upon the window 5, preferably of a phosphor luminescing in green.

Immediately behind the target area thus formed is a grating composed of mutually insulated strips of metal disposed edge-on to the screen. The strips 19 are coated on both sides with a phosphor luminescent in a second primary color (say red) and are connected together, while the alternate intermediate strips 21 are also connected together and are coated on both sides with a phosphor luminescent in a third primary color, in this instance blue. The separation of the strips of the grating is preferably one-half or less of the dimension of the minimum size picture element that the tube is intended to resolve, and the strips are slightly tilted with respect to each other so that their planes intersect substantially at the effective orifice of the electron gun so that when the electron beam is deflected across the grating the portions of the stream not intercepted by the edges of the strips will enter the space between them in a plane substantially parallel to that of the strips themselves. An external lead 23 is brought out of the two from the strips 19 and a similar lead 25 from the strips 21.

The tube thus described is fed by a television receiver for signals of the simultaneous type which, since it is very largely conventional, is illustrated in block form. The conventional units comprise the video receiver 27 which includes the usual tuning units, first detector for separating the sub-carriers carrying each of the three primary color channels, sync separator, main power supply 29, electron gun power supply 31, and horizontal and vertical sweep generators 33. The power supplies 29 and 31 are both fed from the usual alternating current supply lines. Power supply 29 feeds the receiver 27 through lead 35 and the sweep generators through lead 37. The electron gun power supply supplies a low voltage to the heater 7, progressively higher voltages through leads 39 and 41 to the first and second anodes 13 and 15, and may also connect to a guard ring surrounding the target 17 through lead 43. The sweep generators 33 supply sawtooth waves of field and line frequencies through deflecting coils 45 and 47 respectively. Since all of these elements are conventional further description is considered unnecessary.

Turning now to the equipment with which this invention is primarily concerned, it comprises an oscillator 49 which may operate at an arbitrary frequency, preferably of the order of 4 megacycles, although in the present instance this frequency is not critical and therefore the oscillator may be of the free running type and any of the well known oscillating circuits may be used, such as the Hartley, Colpitts, or other standard circuit. It is not necessary that this oscillator develop pure sine waves and it may even be advantageous that its output be clipped somewhat to produce a waveform somewhere between a sine wave and a rectangular wave. Power supply for the oscillator is shown as derived from the power pack 29 through lead 51.

Oscillator 49 feeds a transformer 53, the secondary coil of which connects through condensers 55, 55′ with leads 23 and 25 and grating strips 19 and 21 respectively so that these strips are excited in opposite phase at the oscillator frequency.

Means are provided for biasing the grating strips separately with respect to each other. These means comprise high resistance potentiometers 57 and 57′ connected between lead 43 and ground. A decoupling resistor 59 connects between the moveable arm of potentiometer 57 and lead 23 and a similar resistor 59′ connects the variable contact of potentiometer 57′ with lead 25.

Transformer 53 is provided with two auxiliary windings 61R and 61B which are connected between ground and the screen grids of two gate tubes 63R and 63B respectively through leads 65. One of these leads also connects through a phase rotating circuit comprising a variable series condenser 67 and a parallel resistor 69 to the control grid of a frequency doubler 71, the plate circuit of which is fed through a resonant circuit 73 from the power supply 29. A secondary coil 75, coupled to the resonant circuit 73, connects between ground and the screen grid of a third gating tube 63G. The three color signals received simultaneously by receiver 27 and separated thereby are fed through leads 77B, 77R and 77G to the control grids of the corresponding gating tubes. The plate circuits of these tubes are connected together and their outputs are fed through lead 79 to the control grid 11 of the display tube.

Figures 2, 4:
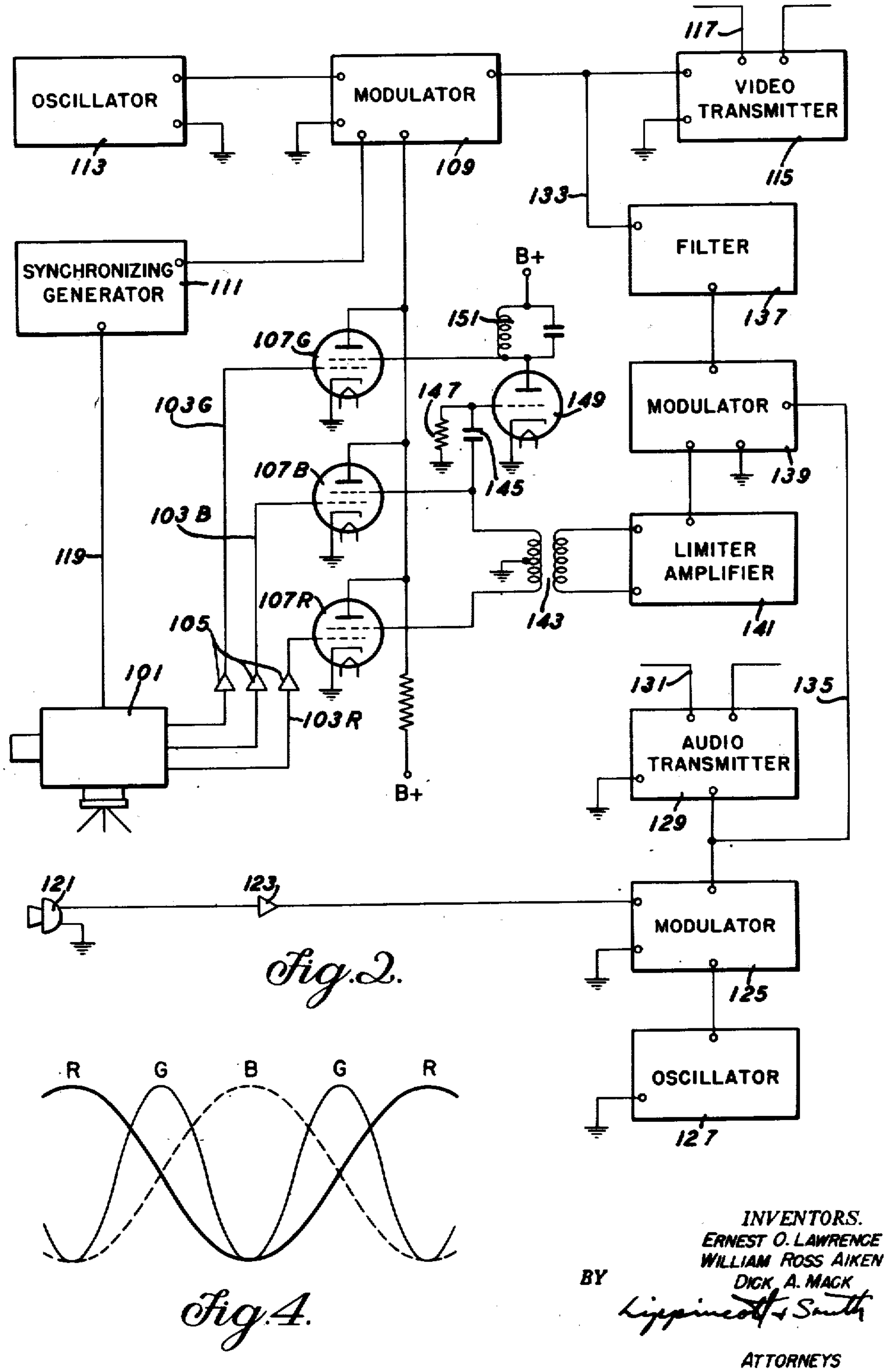
Fig. 2 is a schematic diagram of a transmitter employing our invention for dot-sequential transmissions.
Fig. 4 is a graph illustrative of the phase relationships of the potentials as applied to the color controls of the receiving tube.

The operation of the apparatus can now be described. The voltages developed by the oscillator 49 and frequency doubler 71, as applied to the gating tubes, are illustrated in Fig. 4. Since the screen grids of these tubes receive their voltage solely from the respective oscillators, it will be obvious that these tubes carry current only when the screen grids are positive and that the current which they do carry becomes material only when they are quite highly positive. As the screen grids of tubes 63B and 63R are connected in opposite phase to the same source of oscillation it will be seen that these tubes are gated alternately. The phasing circuit comprising elements 67 and 69 is adjusted so that the second harmonic frequency as developed by tube 71 and filtered by the resonant circuit 73 is 90 degrees out of phase, and therefore reaches its maximum at the instants when the screen grids of tubes 63R and 63B are passing through zero. Tube 63G is therefore gated twice for each time that the tubes carrying either the red or the blue signals are gated, but the intervals during which the gating lasts are only half as long, and since the eye integrates over short intervals and also fails to resolve color over smaller areas than are resolvable as light and shade, the color balance, assuming that the three color signals are equal in intensity, is not disturbed. Furthermore, since the eye is more sensitive to green than it is to either of the other primaries, doubling the frequency of the green signals with respect to the others results in apparent increased visual detail.

The same oscillation which controls the switching of the simultaneously received signals also switches the color displayed by the tube. As has been described in the previously identified copending application, if the strips 19 and 21 are at the same potential as the primary target area 17 the electron beam will pass between the strips constituting the grating and impinge directly upon the target, producing, in this instance, a green image. If, however, a transverse field is set up between the strips and this field is of sufficient magnitude the beam will be deflected laterally until it falls entirely upon the strips coated with a red or blue phosphor as the case may be. The light emitted by the strips is directed by them, as by louvers, and falls either directly or by reflection on the translucent phosphor covering the screen itself and is transmitted thereby to give the effect of light of the particular color which is momentarily being excited. While the arrangement is somewhat wasteful of light it is possible, by a proper adjustment of the exciting potentials and distribution of the phosphors, to secure a proper color balance.

As will be evident from the diagram the potentials from the oscillator 49 are fed to the two sets of grating strips in opposite phase, so that the light emitted on the strips is alternately red and blue in phase with the gating of the red and blue channels by the tubes 63R and 63B. The screen carrying the green phosphor will be excited in the periods between the positive swings of the respective plates and since the green gating tube 63G is also opened during this period the tube will respond properly to the green signals. The color balance can be varied in some degree by adjusting the potentiometers 57 and 57'.

Figure 3:
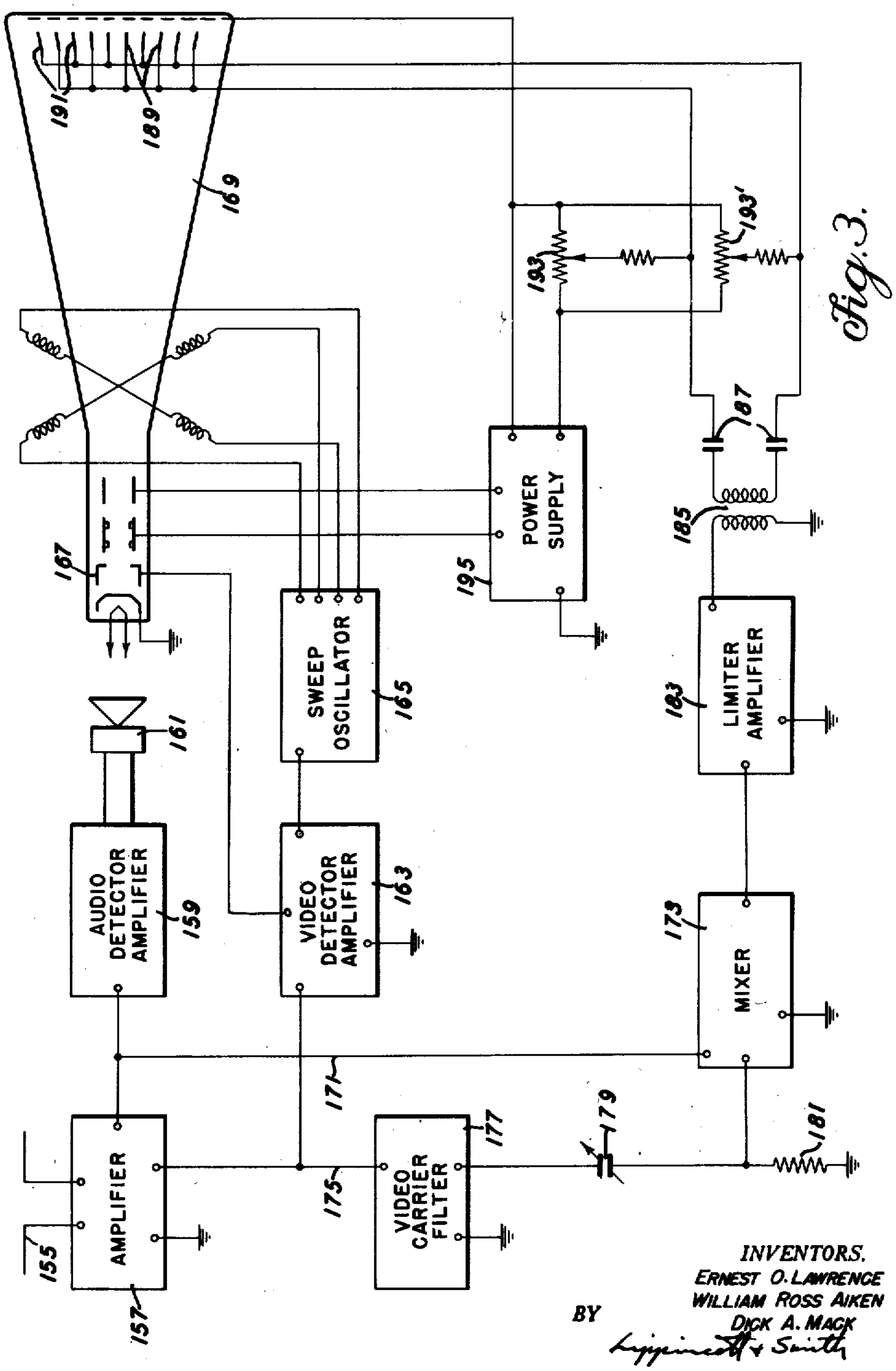
Fig. 3 is a similar diagram showing the application of the invention to a receiver for dot-sequential color transmissions.

In the form of the invention illustrated in Figs. 2 and 3 the procedures, both in regards to gating and to the color switching at the receiving tube, are identical to those already described. In this form of the invention, however, the gating or sampling procedure is carried out at the transmitter, whereas the color switching procedure is, of course, accomplished at the receiving end of the circuit. It follows that separate sources of oscillating potential must be used for the sampling and switching procedures and that these sources must be kept in exact synchronism. Sources of identical frequency are available at both ends of the system in all ordinary black-and-white transmission; i. e., the beat frequency between the video and audio carriers.

Several methods for accomplishing this are available, one of which is shown in Figs. 2 and 3. Fig. 2 is a diagrammatic representation of transmitting equipment and Fig. 3 of receiving equipment suitable for this purpose. Considering first Fig. 2, a three color television camera 101 is provided with three separate pickup tubes and is also provided with a beam splitting optical system for throwing equally dimensioned images of the same scene in three different primary colors upon the sensitive surfaces of these tubes respectively. These images are scanned in the same manner as are ordinary black-and-white images to generate video signals in each of three channels, identified as 103R, 103B and 103G. Each of these channels includes an amplifier 105, the gain of which may be separately adjusted.

Each of these channels terminates at the control grid of a gating tube 107R, 107B and 107G respectively, these gating tubes corresponding in purpose to the tubes 63 in the embodiment first described. As in the former case the plates of all three gating tubes are tied together and their combined outputs are fed into modulator 109 where they are combined with synchronizing signals developed by a sync generator 111 and are modulated upon the video carrier developed by oscillator 113. The modulated signals are then passed to video transmitter 115 and radiated from an antenna 117, with or without further amplification as the case may be. It should be mentioned in passing that the sync generator also feeds the necessary synchronizing pulses to the camera through lead 119.

Sound which accompanies the video signals is picked up by microphone 121, amplified by amplifier 123 and then passed to modulator 125 where it is frequency modulated upon an audio carrier produced by oscillator 127. The frequency modulated carrier is fed into an audio transmitter 129 and is also radiated from an antenna 131 which may either be separate or the same as that used to radiate the video signals.

A portion of the signals produced by modulators 109 and 125 respectively is taken off through leads 133 and 135; the signal from modulator 109 is fed through a filter 137 which selects from the combined signals the carrier frequency, and is mixed in modulator 139 with the unfiltered output of modulator 125. From this modulator the difference or beat frequency between the two carrier frequencies is selected and fed to a limiter-amplifier 141 whose output circuit is connected with the primary of a transformer 143. The secondary of this transformer feeds the screen grids of gate tubes 107R and 107B in opposite phase, thus gating the red and blue signals in the same manner as has been described in connection with Fig. 1. As in that case a portion of the signal fed to one of the two tubes mentioned is taken off through a phase shifting network comprising variable condenser 145 and resistor 147 and thence to the grid of a harmonic amplifier tube 149. The second harmonic is selected in resonant circuit 151 and fed to the screen grid of gate tube 107G, again as has been described in connection with the first form of the invention.

It will be noted that the beat frequency developed between the video carrier and the modulated audio carrier will not remain constant but will vary in frequency in accordance with the frequency modulation of the audio carrier. The separation of the two carriers is of the order of 5 megacycles (which, under present standards, is 4.5 megacycles), while the frequency swing of the audio carrier is of the order of 25 kilocycles. Therefore, although the gating and sampling frequencies will vary with the audio modulation, this variation will not be large when considered relatively but will only be of the order of one-half of one percent. Such a variation, however small, would be important if it were not followed accurately by the switching at the receiver but the latter is designed to accomplish this with a high degree of accuracy.

How this is done is schematically indicated in the receiver diagram of Fig. 3. The signals picked up by the antenna 155 are preamplified by amplifier 157. The frequency modulated audio carrier is passed to audio detector-amplifier 159 and fed to loudspeaker 161 in the usual way. The modulated video carrier is fed to video detector-amplifier 163, the synchronizing signals are separated and fed to the sweep oscillators 165 and the detected video signals are fed to grid 167 of the cathode ray tube 169 which is of the type already described.

Between amplifier 157 and audio detector-amplifier 159 a lead 171 takes off a portion of the signal and feeds it to a mixer or detector 173. Similarly, a lead 175 connected between amplifier 157 and the video amplifier 163 takes off a portion of the modulated video carrier and feeds it through video carrier filter 177 which is sharply tuned to accept practically only the carrier component of the modulated signal. From the video carrier filter the signal passes through a phasing network comprising variable condenser 179 and parallel resistor 181 and thence to mixer 173 where it is combined with the frequency modulated audio carrier and the beat frequency is detected and passed through limiter-amplifier 183.

The output of limiter-amplifier 183 feeds the primary of the transformer 185 which corresponds in function and connection with transformer 53 in the modification of the invention first described. The two ends of the secondary of this transformer connect through condensers 187 to the two sets of colored deflecting strips 189 and 191 respectively, the latter being identical with condensers 57 already described. Similarly, strips 189 and 191 may be biased through potentiometers 193 and 193' which connect between the target or its guard ring and power supply 195. The showing here differs slightly from that shown in Fig. 1, since in this case the power supply is provided with a terminal a few hundred volts negative to that connecting with the guard ring so that lower impedance potentiometers may be used.

It remains to be shown that with this arrangement the switching at the receiver will follow exactly the gating at the transmitter. Since the audio carrier is frequency modulated its frequency will swing over a fairly limited range as has already been mentioned, and this will cause a change of beat frequency with respect to the video carrier. The latter remains fixed in frequency (except, perhaps, for long period swings of an extremely minor nature. At the transmitter some phase shift as between the two signals may take place between the video and audio modulators and their respective antennae, but this phase shift is substantially a constant and while it may change the phase of the beat frequency as received and detected at the receiving end of the system it will not affect its frequency. Since the phase of the beat note is changed by varying the phase of either of the two frequencies which go to produce it, adjustment of condenser 179, changing the phase of the video carrier component at the receiver end, will compensate for any difference in the lengths of the electrical paths to the antennae and bring the switching circuits used at the receiver accurately into line with the gating at the transmitter. It might be mentioned here, however, that in extreme cases a more elaborate phase shifting circuit than that actually shown might be desirable, but such phase shifting circuits are well known and are symbolized by the one illustrated.

The devices here described permit synchronization of sampling circuits at transmitter and receiver with great accuracy. Although primarily designed for use with the multicolor cathode ray display tube here referred to the system is not limited to such use, nor, for that matter, is it limited to the "red-green-blue-green" sampling sequence here preferred but may obviously be applied to the three phase types of sampling which have been shown by the prior art.

Various possible modifications will be readily apparent to those skilled in the art. For example, a highly selective filter system will recover the unmodulated audio carrier at the receiver. Hence it is possible to develop a sampling beat of constant frequency at the transmitter by using the audio carrier before modulation and at the receiver by using the filtered carrier, but the advantages do not, in general, warrant the additional complication. The carriers can be taken off at other points of the system, and multiples or sub-multiples of the inter-carrier beat frequency can be used for sampling and color switching. Phasing of the beat frequency can be accomplished after its generation as well as by varying the phase of either of the carriers. Such modifications are considered to lie within the scope of this invention. The disclosure herein of specific apparatus for use in connection with the system is therefore intended to be illustrative only and not as a limitation upon the system as claimed.

We claim:

1. In a color television system wherein video signals and audio signals are transmitted modulated on separate carrier waves, a receiver including means for displaying images corresponding to said video signals in any of a plurality of colors, electrically actuated switching means operative to select the color wherein portions of such images corresponding to signals received at any specific instant are displayed, and means for controlling said switching means comprising means for receiving the modulated audio and video carrier waves, means for selecting the carrier frequency from the modulation products in at least one of said waves, means for combining said selected carrier frequency with the other carrier wave to produce a wave of beat frequency, and connections for applying said beat frequency to control said switching means.

2. A color television receiver in accordance with claim 1 wherein the carrier frequency selected is that modulated with the video signals.

3. A color television receiver in accordance with claim 1 including means for varying the phase of said beat frequency waves.

4. A color television receiver in accordance with claim 1 including means for shifting the phase of said selected carrier frequency wave to vary the phase of said beat frequency.

5. A color television receiver in accordance with claim 1 including means for selecting the carrier frequency wave from the received viedo signals only and wherein said selected wave is mixed with the modulated audio frequency wave to provide a beat wave of varying frequency.

6. A color television receiver in accordance with claim 1 wherein said image displaying means comprises a cathode ray tube including areas of phosphors luminescent in light of a plurality of primary colors when excited by a cathode ray beam, electrodes for deflecting such beam selectively to excite the phosphor of a specific color, and connections for applying said beat frequency wave to said electrodes in opposite phase to excite alternately the phosphors of two different primary colors.

7. In a color television system including a plurality of circuits carrying respectively video signals representative of a plurality of primary color images of an area to be pictured in polychrome, means for sampling successively the signals in each of said circuits comprising a gating tube fed by each of said circuits, a common output circuit for said gating tubes, a source of oscillating potential, connections for applying said oscillating potential in opposite phase to two of said gating tubes to switch signals to said common circuit from two of said first mentioned circuits alternately, means for developing from said source a wave of double the frequency thereof, and connections for applying said double frequency to a third gating tube at 90° phase rotation with respect to the frequency of said source.

8. Color television apparatus in accordance with claim 7 comprising a cathode ray display tube including means for generating a cathode ray beam, means for modulating the intensity of said beam, means for deflecting said beam in two dimensions and auxiliary electrodes for directing said beam to impinge on areas of phosphors emissive of light of different colors; connections for exciting said modulating means by signals passed to said common circuit by said gating tubes, and connections for applying oscillating potentials of the frequency of said source to said auxiliary electrodes to switch the colors displayed by said tube synchronously with the action of said gating tubes.

9. Television apparatus in accordance with claim 1 wherein said source of oscillating potential comprises two sources of carrier waves of different frequencies, and means for combining said frequencies to produce said oscillating potential as a beat frequency.

10. The method of color television communication which includes the steps of developing three series of television signal impulses each representative of a different primary color component of a single picture area, generating an electrical oscillation of a frequency of the order of magnitude of the higher frequency components in said signal impulses, generating a second oscillation of double said frequency, applying said first mentioned oscillation to select alternately samples from two of said series of signal impulses and applying said double frequency to select samples of the third said series after each sampling of either of the other two series, and combining said samples into a single composite signal.

11. In additive tricolor television apparatus, electronic means to distribute a flow of electrons in accordance with component colors to be represented thereby, means to generate electrical oscillations of a frequency corresponding to a selected repetition rate of a selected color cycle, means for supplying the developed oscillations to the electronic distributing means and means controlled by the supplied oscillations to index each individual color representation relative to the other two of the tricolor.

12. In color television apparatus of the additive tricolor variety, means locally to develop oscillations of a frequency of the general order of the highest modulation frequency to be represented, a plurality of electron-beam receiving means individually allocated each to a different component color of the selected component colors of the tricolor, and means to supply the developed oscillations to control the arrival of a flow of electrons to each electron-beam receiving means in such manner that there is a response indexed to one of the three component colors for each positive wave crest of the local oscillation frequency, a response indexed to a second of the three component colors at each negative wave crest of the local oscillation frequency, and a response indexed to the third component color in the region of each nodal point of the local oscillation frequency.

13. In color television apparatus wherein video modulation signals are received to be converted into electro-optical images, and wherein the images so created become observable from the target of a cathode ray tube as a result of impact of a scanning cathode ray beam in such a fashion that the several elemental areas of the target are caused to portray light values of each component color of a tricolor repeating in a selected cycle, a signal channel to supply the signal modulations to the cathode ray tube, means to control by the signal modulation the intensity of the electro-optical effect produced, means for bi-dimensionally deflecting the cathode ray beam to trace a raster upon the tube target, means locally to develop oscillating wave energy at a frequency of the general order of the highest video modulation frequency received, and means to apply the oscillating wave energy to the scanning beam as a supplemental positioning control in one direction of its deflection, thereby to produce different color representations during those portions of each cycle of oscillation when the locally developed wave energy passes through its positive and negative crests, and the third color during portions of the wave energy cycle generally uniformly spaced in time from wave crest periods.

14. The receiver claimed in claim 13 wherein the means for locally developing oscillations comprises a free-running electronic oscillator.

15. The receiver claimed in claim 13 wherein the means for locally developing oscillations comprises means for deriving from the incoming signals each of the video and the audio carrier frequencies, and means for combining the two derived carrier frequencies for producing a beat frequency as the locally developed oscillating wave energy.

16. The color television receiver claimed in claim 15 comprising, in addition, means for shifting the phase of one of the derived carrier frequencies relative to the other and prior to combination to shift thereby the color instantaneously effective to recreate color image representations.

17. A control circuit for use in a color television system wherein signals representative of a plurality of primary colors are successively transmitted in a regularly recurring sequence modulated on a picture carrier wave and transmitted concurrently with a sound carrier, comprising electrode means adapted to receive the locally developed flow of electrons, means for supplying potentials to the electrodes for controlling the electron flow so as to determine the color to be displayed, means for generating electrical waves of said picture carrier frequency, means for developing electric waves of said sound carrier frequency, means for combining said waves of the sound and picture carrier frequencies to produce waves of a difference frequency, and control circuit means for applying said difference frequency waves to said electrodes in controlled phase as to produce the color desired.

18. Color television apparatus adapted to receive concomitantly transmitted video and audio signals as modulations of substantially constantly spaced carrier waves and to produce electro-optical image representations in color for observation on the target area of a cathode ray tube which comprises means to modulate the intensity of the electro-optical image representations under the control of the received video modulation, means to derive from the received video modulation wave energy representing substantially only the carrier frequency upon which the video signals are transmitted as modulations, means to beat the derived video carrier frequency against the audio carrier received to generate oscillations of a frequency representing the difference between the said two frequencies, and means responsive to the generated oscillations for sequentially indexing the color in which the intensity modulation becomes visible, so as to produce the electro-optical effects in a repeating color cycle including all colors of a tricolor at a repetition frequency coinciding with that of the beat frequency developed.

19. A color television receiver for producing tricolor images upon the target of a cathode ray tube having therein three different character phosphor coatings to produce under electron beam excitation light which is observable in three component colors collectively forming tricolor image representations of the additive variety comprising means to receive video signal modulations and to modulate the intensity of a cathode ray beam under the control thereof, means locally to develop oscillations occurring at a frequency of the general order of the highest video modulation frequency received, and means controlled by the locally developed oscillations for shifting the intensity modulation of the cathode ray scanning beam between the different light-producing coatings so as to convert the signal modulation into intensity modulation in selected component colors of a tricolor in a color cycle repeating at a rate coinciding with that of the locally developed oscillations.

20. A color television receiver wherein video and audio signals are received as modulations of separate carrier waves spaced at substantially constant frequency separation one from the other, and having a cathode ray tube for displaying images corresponding to said video signals in any of a plurality of component colors of a tricolor additive combination comprising switching means operative to select the color wherein portions of such produced images corresponding to signals received at any specific instant are displayed, means to develop color control oscillations at the receiver, and means to control the switching devices from the locally developed oscillations to establish the color in which the received video modulation is observable.

21. In additive tricolor television apparatus wherein signals indicative of three selected additive color components are present, means to develop an oscillation frequency of a value coinciding with a desired repetition of two of the three colors, a switching circuit, means to supply the signals indicative of the color repetition frequency to the switching circuit thereby to gate the circuit at the desired repetition rate, means to supply the signals indicative of color to cause a visible manifestation of the signal modulation and means provided by the switching circuit, as gated by the developed oscillations, to cause the visible manifestations of one of the color signals to occur twice as often as the visible manifestation of either of the two color signals.

References Cited in the file of this patent

UNITED STATES PATENTS

| | | |
|---|---|---|
| 2,438,269 | Buckbee | Mar. 23, 1948 |
| 2,490,812 | Huffman | Dec. 13, 1949 |
| 2,558,489 | Kalfaian | June 26, 1951 |
| 2,587,074 | Sziklai | Feb. 26, 1952 |
| 2,621,244 | Landon | Dec. 9, 1952 |

FOREIGN PATENTS

| | | |
|---|---|---|
| 443,896 | Great Britain | Mar. 10, 1936 |